(12) United States Patent
Sequino et al.

(10) Patent No.: US 12,327,444 B2
(45) Date of Patent: *Jun. 10, 2025

(54) METHODS AND SYSTEMS FOR SECURELY ACCESSING OPERATIONAL DATA

(71) Applicant: INTEGRITY Security Services LLC, Santa Barbara, CA (US)

(72) Inventors: David R. Sequino, Leesburg, VA (US); Amit Kapoor, San Francisco, CA (US)

(73) Assignee: INTEGRITY SECURITY SERVICES LLC, Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/809,670

(22) Filed: Aug. 20, 2024

(65) Prior Publication Data

US 2024/0412572 A1 Dec. 12, 2024

Related U.S. Application Data

(63) Continuation of application No. 18/230,468, filed on Aug. 4, 2023, now Pat. No. 12,094,271.

(60) Provisional application No. 63/370,544, filed on Aug. 5, 2022.

(51) Int. Cl.
*G07C 5/08* (2006.01)
*G07C 5/00* (2006.01)

(52) U.S. Cl.
CPC ........... *G07C 5/0816* (2013.01); *G07C 5/008* (2013.01)

(58) Field of Classification Search
CPC .............................. G07C 5/0816; G07C 5/008
USPC ........................................................ 701/1
See application file for complete search history.

(56) References Cited

U.S. PATENT DOCUMENTS

| | | | |
|---|---|---|---|
| 7,657,540 B1 | 2/2010 | Bayliss | |
| 8,712,803 B1 | 4/2014 | Buentello | |
| 9,280,684 B1 | 3/2016 | Kragh | |
| 9,697,660 B1 | 7/2017 | Sokolov | |
| 12,094,271 B2 * | 9/2024 | Sequino | H04L 63/10 |
| 2012/0041638 A1 | 2/2012 | Johnson | |
| 2013/0227648 A1 * | 8/2013 | Ricci | H04W 12/088 726/3 |
| 2014/0081670 A1 | 3/2014 | Lim | |

(Continued)

OTHER PUBLICATIONS

International Search Report and Written Opinion dated Nov. 8, 2023, for Int'l Application No. PCT/US2023/029547, 10 pages.

*Primary Examiner* — Tyler D Paige
(74) *Attorney, Agent, or Firm* — MH2 Technology Law Group, LLP

(57) ABSTRACT

Systems, methods, computer-readable media, and devices for accessing onboard operational data in a vehicle. The systems, methods, computer-readable media, and devices may include hardware and/or software for performing operations that include: obtaining user information and vehicle information, obtaining verification information, e.g., from a verification source, verifying that a specific user is associated with the vehicle based on the verification information, communicatively connecting to the vehicle based on the vehicle information; obtaining the onboard data from the vehicle; and providing the onboard data to the user. In embodiments, the user may be the owner of the vehicle, the registrant of the vehicle, or a repair person that is servicing the vehicle and needs access to onboard data besides OBD error codes.

24 Claims, 4 Drawing Sheets

(56) References Cited

U.S. PATENT DOCUMENTS

| | | | |
|---|---|---|---|
| 2014/0143839 A1* | 5/2014 | Ricci | G06F 21/31 |
| | | | 726/4 |
| 2014/0309813 A1* | 10/2014 | Ricci | G06V 20/59 |
| | | | 701/1 |
| 2015/0150107 A1* | 5/2015 | Piliouras | H04L 63/102 |
| | | | 726/7 |
| 2016/0241699 A1* | 8/2016 | Milnark | H04W 4/44 |
| 2017/0021764 A1 | 1/2017 | Adams | |
| 2017/0144671 A1 | 5/2017 | Memani | |
| 2017/0272418 A1 | 9/2017 | Kim | |
| 2017/0364869 A1 | 12/2017 | Tarte | |
| 2018/0063110 A1* | 3/2018 | Kiryazov | H04L 63/104 |
| 2018/0315127 A1 | 11/2018 | Chappell et al. | |
| 2019/0149956 A1* | 5/2019 | Chiang | G07C 5/008 |
| | | | 701/36 |
| 2019/0213684 A1 | 7/2019 | Sundar Singh | |
| 2019/0311404 A1 | 10/2019 | Wasserman | |
| 2019/0346840 A1* | 11/2019 | Valeri | G05D 1/0088 |
| 2021/0075825 A1* | 3/2021 | Davis | H04L 63/1416 |
| 2024/0046717 A1* | 2/2024 | Sequino | H04L 63/08 |

\* cited by examiner

METHODS AND SYSTEMS FOR SECURELY ACCESSING OPERATIONAL DATA

CROSS-REFERENCE TO RELATED APPLICATIONS

This application claims priority to U.S. patent application Ser. No. 18/230,468, filed on 4 Aug. 2023, which claims the benefit of U.S. Provisional Application No. 63/370,544, filed on 5 Aug. 2022, the entireties of which are hereby incorporated by reference.

FIELD OF THE INVENTION

This invention relates to the systems, devices, manufactures, and methods for securely accessing onboard operational data, such as the onboard data of a vehicle.

BACKGROUND

Modern vehicles, including cars, trucks, SUVs, RVs, watercraft, snow vehicles, drones, etc. include several computerized subsystems, such as the brake control, steering control, electronics, environment control, engine control, backup camera, suspension control, telemetry, door lock, and/or transmission control subsystems, to name a few among others. A vehicle's subsystems create, collect, track and/or store data that is related to their operation, such as operational information about their settings, their functioning, the surrounding environment, communications to/from the subsystem, the vehicle's movement, inputs from the vehicle operator, and the like. One category of operational data that modern vehicles generate, collect, store, and use is referred to as telematics data, which may include information about the vehicle's use, (e.g., location, speed, etc. from the GPS subsystem or the like), maintenance requirements, (e.g., mileage, warning lights, repair codes, etc. from the subsystems that are onboard a vehicle or the like) and servicing, (e.g., connections to a vehicle repair shop's scanning device and the like), among other things.

Although various portions of a vehicle's onboard operational data can be read by or transmitted to or otherwise accessed by the original equipment manufacturer (OEM) of the vehicle (e.g., Ford, Honda, Chevrolet, etc.), or the OEM of a subsystem (e.g., Bosch, Continental, Denso, etc.), or by a representative of the manufacturer (e.g., the repair shop at an OEM vehicle dealer (e.g., Ford dealer, Honda dealer, Chevrolet dealer, etc.)), the person who owns, leases, and/or uses the vehicle cannot currently access the vehicle's onboard data, which is a significant drawback to the owner, as this lack of data may lead to problems, expenses and failures related to maintenance, safety, or the like that the owner could have otherwise avoided or mitigated if the owner had access to the vehicle's operational data. Similarly, an independent repair shop that does not have the access provided by an OEM sponsorship cannot currently access most of a vehicle's onboard data, (with the typical exception of error codes), which results in similar drawbacks to those mentioned.

BRIEF SUMMARY

Disclosed are systems, methods, computer-readable media, and devices for accessing the onboard operational data from a vehicle. The systems, methods, computer-readable media, and devices may include hardware and/or software for performing operations that include: obtaining vehicle information that specifies a vehicle; obtaining user information that identifies a specific user; obtaining verification information, e.g., from a verification source, wherein the verification information describes the vehicle and the specific user; verifying that the specific user is associated with the vehicle based on the verification information; communicatively connecting to the vehicle based on the vehicle information; requesting the onboard operational data from the vehicle; receiving the onboard operational data from the vehicle; and providing the onboard operational data to the specific user.

In some variants, obtaining vehicle information that specifies a vehicle includes receiving a vehicle identification number (VIN).

In some variants, obtaining user information that identifies a specific user includes receiving a name and a date of birth for the specific user.

In some variants, obtaining verification information, e.g., from a verification source, includes receiving vehicle title information from a department of motor vehicles. In some variants, obtaining verification information, e.g., from a verification source, includes vehicle registration information from a department of motor vehicles.

In some variants, verifying that the specific user is associated with the vehicle includes comparing the user information that identifies a specific user with the verification information that describes the specific user.

In some variants, the operation further include storing the onboard operational data that is received from the vehicle. In some such variants, providing the onboard operational data to the specific user includes providing the onboard operational data that was stored.

In some variants, the specific user is a registrant of the vehicle or a repair person.

And in some variants, communicatively connecting to the vehicle based on the vehicle information includes communicatively connecting to the vehicle using a vehicle identification number.

Also disclosed are systems, methods, computer-readable media, and devices for accessing the onboard operational data in a vehicle. The systems, methods, computer-readable media, and devices may include hardware and/or software for performing operations that include: obtaining user information and vehicle information from a user; determining that the user is an owner or a registrant of the vehicle based on the user information and the vehicle information; communicatively connecting to the vehicle based on the vehicle information; obtaining the onboard operational data from the vehicle; and providing the onboard operational data to the user. The variants of this implementation include all of the variants mentioned above, among others.

It is intended that combinations of the above-described elements and those within the specification may be made, except where otherwise contradictory.

BRIEF DESCRIPTION OF THE DRAWINGS

The accompanying drawings, which are incorporated into and constitute a part of this specification, illustrate examples and embodiments of the invention and together with the description, serve to explain the principles of the invention.

DETAILED DESCRIPTION

Reference will now be made in detail to embodiments of the invention, examples of which are illustrated in the accompanying figures.

Various embodiments and implementations consistent with the invention provide systems, devices, methods, and computer program products for securely accessing the onboard operational data, (which may also be referred to as onboard data), that is stored in a vehicle, including access by a device (e.g., a computer, tablet, smart phone, etc.) of an owner, lessee, registrant of the vehicle, police agency, or other entity that is not associated with an OEM. As described herein, various embodiments provide a new technical capability and the technical infrastructure for an ordinary (e.g., non-OEM sponsored or affiliated) vehicle owner, lessee, person who registers a vehicle, repair shop worker, and the like, to access the vehicle's onboard data, (including non-error-code data that is currently accessible only by OEM affiliates), such as the telematic data or telemetric data (as contrasted with vehicle error code data, which can be accessed by a non-OEM on-board-diagnostics (OBD) scanner). Various embodiments verify that the user requesting the onboard data is in fact associated with the vehicle in a prescribed manner—for example, is associated with the vehicle as the owner, lessee, registrant, owner-authorized repair shop, or the like—before providing access to some or all of the vehicle's onboard data. In some embodiments, the vehicle-associated user may set up an account for or that includes each owned/leased/registered/repaired vehicle, e.g., based on each vehicle's vehicle identification number (VIN). From that account, the vehicle-associated user can access (e.g., read or copy) at least a portion of each vehicle's onboard data, which is accessible only by OEMs in current conventional systems.

Figure 1:
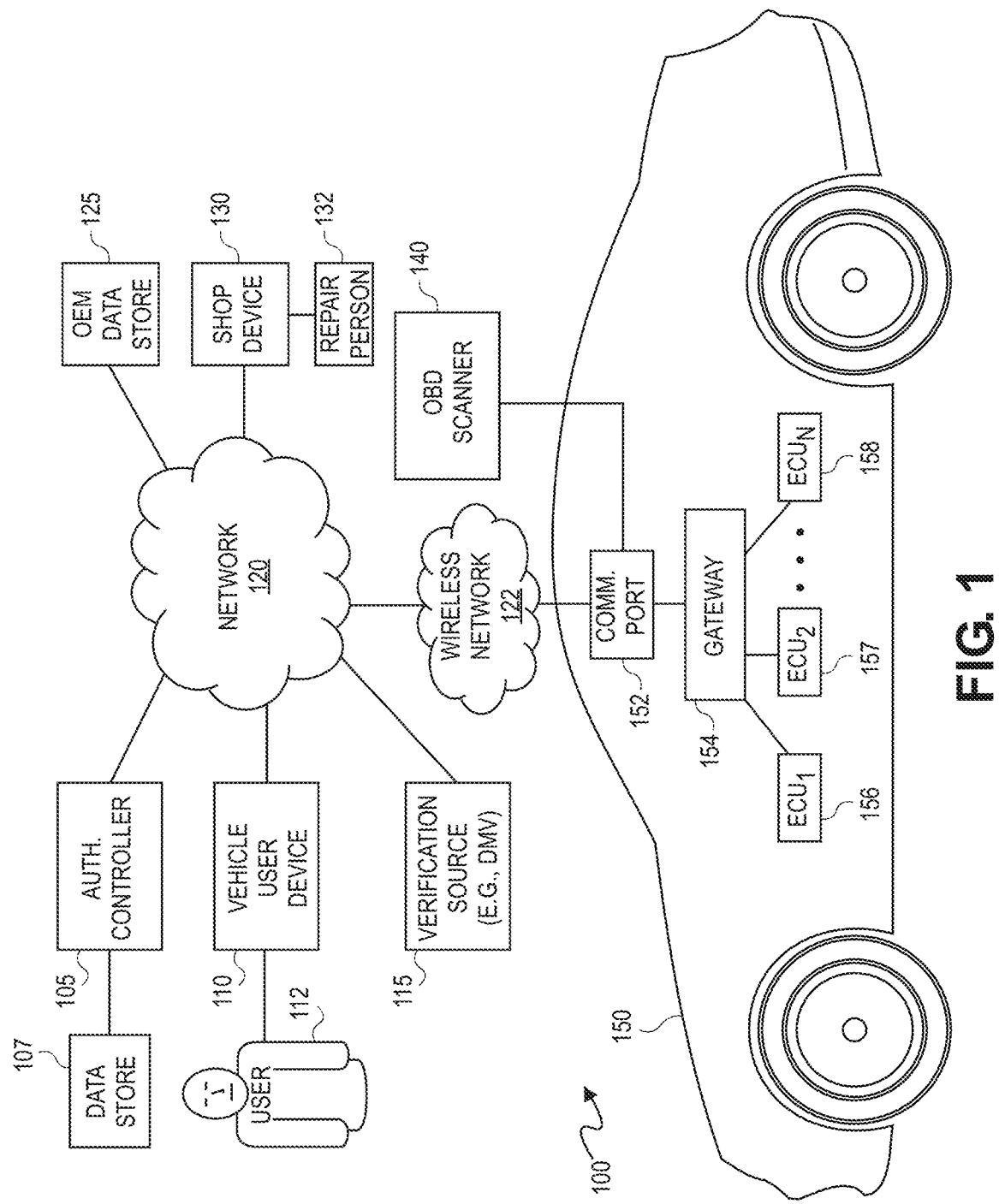
FIG. 1 is block diagram showing an example of a system for securely accessing the onboard operational data stored in a vehicle, consistent with embodiments of the invention.

FIG. 1 is block diagram showing an example of a system 100 for securely accessing the operational data stored onboard in a vehicle, consistent with embodiments of the invention. As shown in this example, a vehicle 150 (e.g., a car in this illustration) is communicatively connected to one or more networks, such a wireless network 122 and a general network 120, which may include wired and wireless features. And via the networks 120, 122, the vehicle 150 may also be communicatively connected to one or more remote devices, such as an authorization controller 105 and/or an OEM data device 125. As shown, any of the other remote devices that are connected to the network 120, 122 may communicatively connect with each other—for example, the authorization controller 105 may also connect with a vehicle user device 110, a repair shop device 130, a verification source device 115, and/or the OEM data device 125. As shown in this example, one or more of the remote devices may be associated with (e.g., operated by) a person, such as a user 112 (e.g., vehicle owner) associated with the vehicle user device 110 and a repair person 132 associated with the shop device 130. Also as shown in this example, the vehicle 150 may also be directly communicatively connected to a remote device, such as an OBD scanner 140, without utilizing a network 120, 122.

As shown in example of FIG. 1, the vehicle 150 includes a number of electronic control units (ECUs) 156, 157, 158, or the like; although only three ECUs 156-58 are expressly depicted, there are typically many more ECUs in a vehicle 150 (e.g., a car or truck), as represented by the ellipsis. An ECU may also be referred to as electronic control module (ECM). In various implementations, an ECU may be part of an embedded subsystem in the vehicle 150, and each ECU may control or be part of one or more of the functions, features, or subsystems in the car or other vehicle, such as the fuel subsystem, chassis control subsystem, generator subsystem, multimedia electronic subsystem, brake subsystem, navigation subsystem, safety subsystem, adaptive cruise control subsystem, engine control subsystem, security (door lock) subsystem, etc. In some uses, an ECU may be, or be part of, or be connected to, an on board unit (OBU), as is known in the art. An ECU is typically a computerized device that, among other things, creates, gathers, and/or stores data related to itself and to the vehicle and its operations. The data may include telematics data and other non-error-code data. In general, the ECUs 156-58 depicted in FIG. 1 and discussed herein represent any and all data sources and data storage devices in the vehicle, and this disclosure is not limited to data that comes only from ECUs, but instead includes all onboard data in the vehicle 150 from whatever the source.

In the example of FIG. 1, the ECUs 156-158 are communicatively connected to a gateway 154, which has novel operations and functions as described herein. The gateway 154 may be considered another type of ECU. In various embodiments, the gateway 154 may be a computer, digital logic module, or a computerized device (e.g., similar to a router device or a firewall device) that controls communication with, and access to, the ECUs 156-158 and their data. In such embodiments, the gateway 154 may function to block access (e.g., reject read requests) to the ECUs 156-158 and their data from unauthorized requestors, and to grant access, or partial access, to the ECUs 156-158 and their data for authorized requestors. Note again that although the term ECU is used herein for clarity of explanation, this disclosure includes any data sources onboard the vehicle 150, including ECUs.

As shown, the gateway 154 is communicatively connected to a communications port 152, which may be or include an onboard diagnostics (OBD) port for a car or the like, as is known in the art. In some embodiments, the communications port 152 may be or include a hardware connection point(s), such as an OBD-II 16-pin diagnostic connector or the like. In other embodiments, the communications port 152 may be or include a device that includes one or more wireless connection point(s) (e.g., Bluetooth, LAN, cellular, etc.) and possible also a hardware connection point(s).

In various embodiments, a remote device may communicatively connect (e.g., via wire or wirelessly) to the communications port 152 and interact with the gateway 154. In one example shown, the remote device may an OBD scanner 140 (also known as a car diagnostic code reader); in another example, the remote device may be an authorization controller 105, which is new device with novel operations and functionality as described herein. OBD scanners are known in the art and they only read error codes from the vehicle 150, e.g., for use by mechanics. In this example, the OBD scanner 140 may connect to the communications port 152 using a wire cable that a mechanic plugs into the communications port 152. The authorization controller 105 may connect wirelessly to the communications port 152; for instance, via a cellular connection provided via a wireless network 122, and enable a non-OEM-affiliated entity, such as a user 112 or a repair person 132, to gain access to the onboard operational data from the vehicle 150, either indirectly or directly in various embodiments.

The gateway 154 may receive and process requests for onboard data from remote devices, where each request may specify the requestor, the onboard data that the requestor wants and/or an ECU(s) 156-158 that will supply the data.

In various implementations, the gateway 154 may initially process a received data request to identify and authenticate the requestor (e.g., the requesting device), as is known in the art, (e.g., using digital certificates or the like). Using the example of FIG. 1, the gateway 154 may identify one requestor as being the OBD scanner 140 and determine that the OBD scanner 140 is authorized to communicate with the gateway 154 based on the scanner's digital certificate. Similarly, the gateway 154 may identify another requestor as being the authorization controller 105 and determine that it is authorized to communicate with the gateway 154 based on its digital certificate.

Based on the identity of each authenticated requestor and/or the data that is being requested from an ECU, the gateway 154 may either reject (e.g., block) or accept the request, where accepting the request allows the authenticated requestor to access the requested data. For example, the gateway 154 may grant a request from the OBD scanner 140 to read the error code data from the vehicle (as is known in the art), and may reject a request from the OBD scanner 140 to read telematics data from the vehicle.

In some embodiments, the gateway 154 may use previously stored access permission(s) to determine whether or not the authenticated requestor is authorized to access (e.g., read, copy, receive, or the like) the data from a specific ECU, where the ECU may correlate to a specific type of data. In various embodiments, the access permission(s) stored by the gateway 154 may be updated or changed periodically or as needed, for example, to add new authentic requestors, which are typically remote devices (e.g., new authorization controllers 105) that have arranged to access some or all of the vehicle 150's onboard data or, for example, to remove or update the access permissions of previous authentic requestors that have experienced changes to their access authorizations.

In some embodiments, the access permissions may be in the form of a look-up table, such as Table 1 below. As shown, Table 1 may indicate that the OBD scanner 140 can obtain data from ECU 156, (which is this example is the ECU that generates and maintains the vehicle's error code data), but cannot access data from ECU 157 or ECU 158. Similarly according to Table 1, if the requestor is an OEM-affiliated repair shop, then the gateway 154 will allow access to the onboard data associated with ECUs 156, 157, or 158; if the requestor is an independent repair shop, then the gateway 154 will allow access to the onboard data associated with ECUs 156 or 157; if the requestor is a user (e.g. registrant, among others) of vehicle, then the gateway 154 will allow access to the onboard data associated with ECUs 156 or 158; and an authorization controller requestor has access to all of the onboard data.

TABLE 1

| REQUESTOR ID | ACCESS PERMISSIONS |
| --- | --- |
| OBD Scanner | ECU 156 |
| OEM-affiliated Shop | ECU 156, ECU 157, ECU 158 |
| Independent Shop | ECU 156, ECU 157 |
| User | ECU 156, ECU 158 |
| Authorization Controller | ALL (ECU 156, ECU 157, ECU 158, GW 154) |

If the request is rejected, (e.g., according to the permissions stored in Table 1), then the authenticated requestor is denied access to the requested data. If the request is granted by the gateway 154, then the requestor is able to access the requested data from an ECU; for example, the requestor may be able to upload, copy, receive or otherwise obtain the requested data from the ECU.

In some embodiments, the authorization controller 105 may set or provision the access permissions used by the gateway 154 to determine whether or not a requestor is authorized to access specified onboard data. For example, the authorization controller 105 may create and/or modify a look-up table, such as Table 1, to grant or remove permissions for specific requestors, for specific types of requestors, and/or for specific roles. The ability of the authorization controller 105 to set the access permissions is represented in Table 1 by listing the gateway "GW 154" as being a component to which the authorization controller 105 has access.

As noted above, the system 100 includes a network 120 and a wireless network 122, which are communicatively connected. The network 120 may be, or be part of, any sort of network, such as the Internet, a private network, a virtual private network, a cellular network, a wireless local area network or any combination of these. The wireless network 122 may be, or be part of, any sort of sort of wireless network, such as a cellular network, a wireless local area network, a wireless wide area network, or a combination of these. Although the network 120 and the wireless network 122 are shown as being separate in FIG. 1 for clarity of explanation, in various embodiments, the network 120 and the wireless network 122 may be combined into one network that is capable of both wired and wireless communications. As noted above, the networks 120, 122 may be connected to various systems and computerized devices, such as servers, portal computers, laptop computers, client devices, smart phones, etc. In general, the networks 120, 122 enable digital communications between the computerized devices connected to them, including the computerized devices that are included in the vehicle 150, such as the ECUs 156-158 and the gateway 154.

As mentioned above, the system 100 includes a novel authorization controller 105. The authorization controller 105 may be implemented as a server computer (e.g., having at least one processor and an associated data storage device(s), such as a memory). In various implementations, the authorization controller 105 may, among other things, function to: authenticate and securely communicate with users of the system 100, e.g., the user 112/vehicle user device 110 or the repair person 132/shop device 130; securely communicate with and manage gateway devices in vehicles, (e.g., the gateway device 154); securely communicate with and gather verification information from one or more verification source 115, (e.g., a verification source 115 that is maintained by a department of motor vehicles (DMV) or that includes a copy of the records maintained by a DMV); securely communicate with and gather information from original equipment manufacturers (OEM), (e.g., an OEM data store 125 of the manufacturer of the vehicle 150 or the like); create and store account records for users 112, repair persons 132, and the like; create and securely distribute access permissions to vehicles 150, (e.g., as described with regard to Table 1 above); and/or obtain, copy, distribute, and/or store, (e.g., in a data store 107, which may, e.g., be a database or the like hosted on the same or a different computer than the controller 105), onboard data from vehicles 150.

As shown in the example of FIG. 1, the authorization controller 105 is communicatively connected to the OEM data store 125 (which may, e.g., be implemented as a server or the like hosting a database containing OEM data) via the network 120. The OEM data store 125 may store data, information, and digital assets related to individual vehicles produced by the OEM (e.g., a copy of the onboard data from the vehicle 150 that was collected and stored by the OEM) and/or related to a group or type of vehicle to which the vehicle 150 belongs (e.g., data about 2019 Nissan Muranos, such as maintenance bulletins or recalls). Although FIG. 1 uses "OEM" data store 125 as a convenient label, other various embodiments may include any data, (e.g., onboard data from a vehicle 150) that is collected or stored by other entities. Embodiments of the system 100 are not limited to only OEM-sourced data.

The authorization controller 105 is also communicatively connected to a shop device 130, which may, in various embodiments, be implemented, e.g., as a separate computerized device (e.g., a server, smart phone, tablet, or other computer) that connects to a web portal, application programming interface (API), or other interface that is controlled by the authorization controller 105, or that runs an application for interacting with the authorization controller 105, among other implementations. In various implementations, a repair person 132 on the staff of a vehicle repair shop may use the shop device 130 to interface with the authorization controller 105 and manage their access to the onboard data, devices, and subsystems (e.g., the ECUs 156-158) of the vehicle 150 and/or other vehicles that the repair shop services is associated with or interested in. As used herein, "repair person" is not meant to be limited to only persons who perform repairs, and is instead used to refer to any person or entity that provides any sort of service to or for a vehicle, including technical and maintenance services, including, without limitation, locksmith services, transmission mechanic services, brake mechanic services, engine mechanic services, tire services, fueling or electrical charging services, etc. Similarly, the terms "shop," and "repair shop," are not meant to be limited to only shops or only to shops that perform repairs on vehicles, and is instead used to refer to any business or organization that provides any sort of service to or for a vehicle.

In various implementations, a repair person 132 may employ the shop device 130 to perform several functions within the system 100. Although FIG. 1 uses "repair person" 132 as a convenient example, in embodiments the person 132 could be another person associated with a repair shop, such as the owner, the manager, an employee, or the like. In various embodiments, the functions of the shop device 130 include, without limitation, interfacing with the authorization controller 105, verifying the authenticity of the shop device 130 and/or the repair person 132, setting up a repair shop account, and managing the access to the onboard data of vehicles, such as the vehicle 150. In such implementations, the authorization controller 105 may verify that the repair shop having the shop device 130 and the repair person 132 is a bona fide vehicle repair shop, for example, by confirming that the repair shop is properly registered with the state, and/or has proper business permits and business licenses associated with it, which may be done using state and/or local municipality business records, or similar verification information, from a verification source 115. Similarly, the authorization controller 105 may verify that the shop's repair person 132 is a bona fide auto mechanic by confirming that the person 132 has a professional license or mechanic certification or other verification information, which may be done using state or municipal licensing records or professional training organization records, (e.g., National Institute for Automotive Service Excellence (ASE) records), from a verification source 115. In some implementations, the repair shop may pay a fee(s) (e.g., a subscription fee) for the onboard operational data access service(s) provided by the authorization controller 105, and the fee(s) may vary depending on how much and/or which onboard data is accessed and how many vehicles are covered.

In some implementations, the shop device 130 (e.g., by running an application or connecting to a web portal or API provided by the authorization controller 105) may collect identifying information from a user(s) (e.g., repair person 132) at the repair shop, such as username, password, two-factor identification data, a facial recognition image, a fingerprint, etc., and provide the identifying information to the authorization controller 105. The authorization controller 105 may store the identifying information in an account for the repair shop device 132 and authenticate a person 132 before allowing the person 132 to access data from a vehicle 150. For example, the authorization controller 105 may look up identifying information (e.g., a username and password) that is associated with a specific user 132 and that it previously verified and stored, and compare the stored identifying information to the identifying information collected by the shop device 130.

As shown in the example of FIG. 1, the authorization controller 105 is also communicatively connected to a vehicle user device 110, which may, in various embodiments, be implemented, e.g., as a separate computerized device (e.g., a server, smart phone, tablet, or other computer) that connects to a web portal or other interface that is controlled by the authorization controller 105, or that runs an application for interacting with the authorization controller 105, among other implementations. In various implementations, a user 112 who is related to the vehicle 150, (such as the owner, lessee, registrant, and/or operator of the vehicle 150), may employ the vehicle user device 110 to, without limitation, interface with the authorization controller 105, verify their identity and relationship (e.g. owner, lessee, registrant, etc.) with the vehicle 150, set up an individual account, and manage their access to the data of their vehicle 150 and/or other vehicles they own, operate, to which they are otherwise related.

In view of the vehicle user device 110 and the shop device 130, the system 100 may be thought of as providing a new role based access control (RBAC) capability for the onboard data in the vehicle 150. Other implementations of the system 100 may include additional interfaces and/or additional ports that support access for additional roles in addition to the vehicle user role and the repair person/shop role.

In various embodiments, the authorization controller 105 may authenticate or verify that the user 112 using the vehicle user device 110 has a specific relationship to the vehicle 150, (e.g., is the actual owner, lessee, and/or registrant of the vehicle 150, among others) before allowing the user 112 to access the onboard data from the vehicle 150, such as the operational data associated with the ECUs 156-158, and the like. In some such embodiments, the authorization controller 105 and/or the vehicle user device 110 may collect information from the user 112 that is used to verify that the user 112 has the relationship to the vehicle that was claimed by the user 112, such as claiming to be the owner, lessee, and/or registrant of the vehicle 150. The information collected from the user 112 should include information that is independently available from a verification source 115, e.g., from the DMV. Two examples of information collected from the user 112 are information from the DMV-issued registration document for the vehicle 150 (e.g., registrant's name, registrant's address, vehicle title number, vehicle identification number (VIN), registration state, registration issue date, license plate number, vehicle make, model, and year, vehicle purchase date, and the like) and/or information from the DMV-issued title document for the vehicle 150 (e.g., owner's name, owner's address, title number, title state, vehicle identification number, title issue date, vehicle make, model, and year, title odometer reading, prior title number, and the like).

In some embodiments, the information collected from the user 112 may include information that the authorization controller 105 uses to set up an account for the user, such as name, address, telephone number, email address, biometric information, password, and the like. In some such embodiments, this information may be used to set up two factor authentication for the account, so that the system can authenticate the identity of the user 112 at subsequent logins via the vehicle user device 110.

In various embodiments, the authorization controller 105 may not allow the user 112 to access data from the vehicle 150 unless the authorization controller 105 can confirm that the user 112 does in fact have the claimed relationship to the vehicle 150, (e.g., is in fact the owner, lessee, and/or registrant of the vehicle 150). For example, in order to verify that the user 112 is the actual registrant of the vehicle 150, the authorization controller 105 may access and analyze data (e.g., verification information) from the verification source 115, which in this example is the DMV of the state in which the vehicle 150 is registered. For instance, the authorization controller 105 may verify that the registration information entered by the user 112 (e.g., registrant's name, registrant's address, vehicle title number, vehicle identification number, registration issue date, license plate number, vehicle make, model, and year, and vehicle purchase date) matches the registration information from the DMV 115 for the vehicle 150. In such embodiments, users 112 who do not have all of the registration information cannot access the data from the vehicle 150 because the system 100 will detect that they are not the person who registered the vehicle 150 at the DMV.

In some situations, the vehicle may be legally owned by a financial institution or a lessor, and the user 112 may be a loan borrower or a lessee who registered, possesses, and drives the vehicle 150, even though the user 112 may not legally own it and thus may not have the title document, and the system 100 may enable such a user 112 to access the vehicle 150's data because the vehicle is registered to the user 112, either solely or jointly. Similarly, the vehicle may be owned by an organization, such as a corporation, and the user 112 may be an employee (or the like) of the organization, and embodiments of the system 100 may allow the employee/user 112 to access the vehicle 150's data when the employee/user 112 can provide the organization's vehicle registration information to the authorization controller 105, which will verify that the information matches the registration records from the verification source (e.g., the DMV) 115.

In some embodiments, the authorization controller 105 may allow a user 112 who is a law enforcement officer or agent to access data from the vehicle 150 if the authorization controller 105 can confirm that the user 112 is in fact a law enforcement officer or agent. In order to verify that the user 112 is a law enforcement officer or agent, the authorization controller 105 may access and analyze data or verification information from a verification source 115, such as a state or federal law enforcement database that holds identity information (e.g., name, social security number, date of birth, officer badge number or identification number, biometric data, etc.) for the law enforcement officers and agents in a jurisdiction. In some such embodiments, the system 100 may also require and verify that the law enforcement officer or agent has a search warrant for the vehicle 150 before allowing access to the vehicle's onboard data.

As a simple, non-limiting use case for the system 100 (among many others), consider the example where the user 112 is the owner of the vehicle 150, which is registered to the user 112 in the state DMV. The user 112 may use the vehicle user device 110 to interface with the authorization controller 105. In some embodiments, the vehicle user device 110 may be a laptop computer that interfaces with an internet website (e.g., a web portal) controlled by the authorization controller 105. The user 112 may enter information from the vehicle registration document issued by their state's DMV for the vehicle 150, such as their name, their address, the vehicle title number, the vehicle identification number, the vehicle license plate number, and the vehicle make, model, and year, and the user 112 may request access to all or some of their vehicle 150's onboard data (for example, request data from all of the ECUs, request telematic data, or request data from specific subsystems, such as data from ECUs 156 and 158 only). In some embodiments, the user 112 may pay a fee for the data access service(s) provided by the authorization controller 105, and the fee may vary depending on how much and/or which onboard data is accessed.

After receiving the vehicle-registration information that was entered by the user 112, the authorization controller 105 may request, obtain, or otherwise access the corresponding verification-information data from the verification source 115. In this example, the authorization controller 105 may obtain, from the DMV 115, the DMV's data from the vehicle registration for the vehicle 150 having the VIN entered by the user 112. The authorization controller 105 may then compare and analyze the vehicle registration information entered by the user 112 with respect to the DMV's corresponding data.

If the two data sets match, then the authorization controller 105 may be deemed to have verified that the user 112 is in fact the registrant of the vehicle 150, in this example. Following verification, the authorization controller 105 may connect to the vehicle 150 via the networks 120 and 122 and request or otherwise obtain the onboard data specified by the user 112. The authorization controller 105 may then provide the requested onboard data to the user 112, e.g., by displaying it or providing a downloadable file via the vehicle user device 110. Thus, the system 100 provides a new technical capability and a novel technical infrastructure to allow access to onboard data from a vehicle 150 to a verified user 112, who in this example has registered the vehicle 150, providing a novel, secure, data retrieval capability that does not exist in current conventional systems.

One of ordinary skill will recognize that the components, processes, data, operations, and implementation details shown in FIG. 1 are examples presented for conciseness and clarity of explanation. Other components, processes, implementation details, and variations may be used without departing from the principles of the invention, as this example is not intended to be limiting and many variations are possible. For example, for clarity of explanation, a single instance of the vehicle 150 is shown in FIG. 1, but the invention is not so limited, and in other embodiments there may be multiple vehicles 150. Similarly, for clarity of explanation, single instances of the components 105, 110, 115, 120, 122, 125, and 130 are shown in FIG. 1, but the invention is not so limited, and in other embodiments there may be multiple instances of any or all of these.

For example, some embodiments of the system 100 may include multiple components similar to the user device 110 or the shop device 130 and multiple entities akin to the user 112 or the repair person 132, so as to allow the entities to access the onboard data in the vehicle(s) 150 in a similar manner.

As another example, the system 100 could include a charger/fueler device and application and/or a corresponding web portal or API managed by the authorization controller 105 via which charge stations, charge point operators, e-Mobility service providers, gas stations, and the like can access onboard data for vehicles that they are charging/fueling, similar to those described herein. For yet another example, the system 100 could include an applications portal or API managed by the authorization controller 105 via which software applications and the like (e.g., mobile navigation apps that desire to use the vehicle 150's geolocation data) can access onboard data as described herein. In yet other embodiments, there may a single type of multipurpose API or portal (e.g., akin to a combination of the web portals that may be used by devices 110 and 130) that enables multiple different type of entities (e.g., 110/112, 130/132) to access the onboard data. Other variations are possible.

For yet another example, some embodiments may not include, or may no utilize a verification source 115. In such embodiments, the authorization controller 105 may verify that the user is associated with the vehicle using information provided by the user 112, such as a copy of the user's driver's license and a copy of the user's vehicle title and/or registration. Using these documents, the authorization controller 105 can verify that the user information from the driver's license, such as name, date of birth, and address match the corresponding verification information from the vehicle title document and/or the vehicle registration document.

For yet another example, one of ordinary skill will recognize that other embodiments may replace the permissions authorization data structure represented by Table 1 with other means and/or data structures for determining which onboard data a requestor is allowed to access.

One of ordinary skill with further recognize that although a car is used as an example of a vehicle 150 in FIG. 1 and other places herein, the vehicle 150 could be any type of vehicle, such as a truck, an SUV, an RV, a watercraft, an aircraft, a snow vehicle, a drone, etc. The inventors further note that the although a communications port 152 is described in connection with FIG. 1 for clarity, the exact hardware and techniques used to connect the gateway 154 with a requestor are not critical to the invention.

Figure 2:
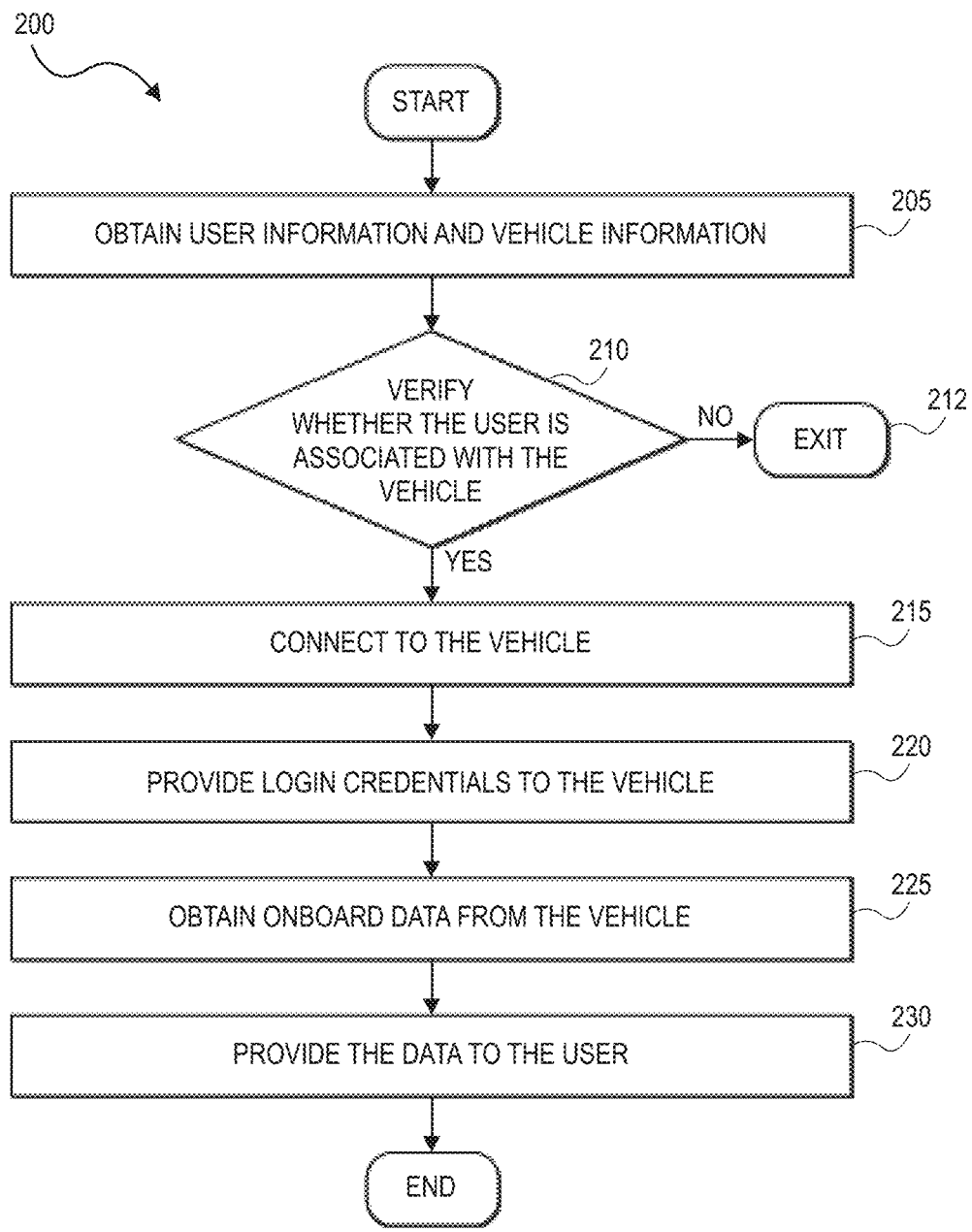
FIG. 2 is flow diagram showing an example of a process for securely accessing the onboard operational data stored in a vehicle, consistent with embodiments of the invention.

FIG. 2 is flow diagram showing an example of a process 200 for securely accessing the onboard operational data stored in a vehicle, consistent with embodiments of the invention. In various implementations, some or all of the operations of the process 200 may be performed by the authorization controller 105 or a similar computing system.

As shown in the example of FIG. 2, the process 200 begins at block 205 by obtaining user information and vehicle information. In various implementations the vehicle information may include information that uniquely specifies a certain vehicle (e.g., a VIN in cases where the vehicle is a car) and may also include a description (e.g., a name, category, or the like) of the operational data that the user is requesting to obtain from the vehicle 150, such as "location data, speed data, idling time data, acceleration data, braking data, fuel consumption data, and tire pressure data." In various implementations the user information may include information that uniquely identifies a specific user, such as a driver's license number, a social security number, a registration number, or a title number.

In some implementations, the process 200 may obtain the user information and vehicle information from the user 112, for example by prompting the user 112 to enter the appropriate information via the device 110 connected to a vehicle-user web portal associated with the authorization controller 110. For instance, the user 112 may be prompted to enter information identifying the user 112, such as name, date of birth, social security number, driver's license number, etc., or such as a username and password or biometric information in the case of a user 112 who has previously set up an account with the authorization controller 110. The user 112 may also be prompted to enter information specifically identifying the vehicle(s) 150 from which data is desired, such as VIN information, make, model and year information, etc. The user 112 may also be prompted to enter information identifying the data that the user wishes to obtain from the vehicle 150, such as specific types of operational data that is stored by the vehicle 150. In some implementations the process 200 may present a list or menu of onboard data, etc. to the user 112, and the user 112 may select the desired onboard date (e.g., by clicking on items displayed in an on-screen menu).

In some implementation of block 205, the process 200 may prompt the user 112 to enter information from, or that is typically found on, a vehicle title document and/or from a vehicle registration document. In some such implementations, the process 200 may also prompt and/or require the user to enter information about their self (e.g., information from a driver's license or other government-issued identification) and/or information that corresponds to a vehicle (e.g., 150) that is associated with the user (e.g., owned, leased, registered, driven, repaired by, fueled by, etc.), for example, information from the title document, such as the owner's name, owner's address, title number, title state, vehicle identification number, title issue date, vehicle make, model, and year, and/or the like. Additionally or alternatively, the process 200 may prompt and/or require the user to upload a copy (e.g., a PDF scan, a JPG digital photo, or the like) of the title and/or registration document for the vehicle 150 and/or of the driver's or mechanic's license of the user 112.

At block 210, the process 200 determines or verifies whether the user is associated with the vehicle in a prescribed manner. Nonlimiting examples of acceptable associations are being the owner of the vehicle, being the registrant of the vehicle, being a lessee of the vehicle, being a lien holder of the vehicle, being a service person who is repairing or fueling the vehicle, etc. In various implementations, the authorization controller 105 may use data from a verification source 115 to make this determination. For example, in the case where the vehicle 150 is car and the user 112 is the owner, the verification source 115 may be a DMV website or database, an auto dealer's records for new car sales and leases, or the like. In such a case, the authorization controller 105 may request, download, access, or otherwise obtain verification information, such as an electronic copy or the like of a vehicle title using the title number (and/or other information) that was obtained in block 205 from the user 112. After obtaining the electronic copy of the vehicle title from the DMV 115, the authorization controller 105 may compare the verification information in one or more fields of the vehicle title to the corresponding information provided by the owner/user.

Continuing the vehicle owner example, if the verification information in one (or in some implementations, more than one) field of the vehicle title does not match the corresponding information provided by the user 112 (e.g., if the owner's name, owner's address, vehicle identification number, and/or title issue date from the DMV title information does not match the owner's name, owner's address, vehicle identification number, and title issue date obtained from the user 112 in block 205), then the user 112 is not verified as being associated with the vehicle 150, and the process 200 exits (block 212). In some embodiments, when the process 200 exits, the process 200 may communicate to the user 112 that the user will not be granted access to the onboard data because the user 112 could not be confirmed or verified as being associated with the vehicle; in this case, verified as being the owner.

If, on the other hand, the information in all of the fields (or in some implementations, in specific selected important fields) of the verification information—e.g., the DMV vehicle title—does indeed match the corresponding information provided by the user 112 (e.g., if the owner's name, owner's address, vehicle identification number, and title issue date from the DMV title information are essentially the same as the owner's name, owner's address, vehicle identification number, and title issue date obtained from the user 112 in block 205), then the user is verified as being associated with the vehicle, and the process 200 proceeds to connect to the vehicle at block 215. In various embodiments, the process 200 (e.g., as implemented by the authorization controller 105) may connect to the vehicle 150 based on the VIN of the vehicle 150, and/or based on other information identifying the vehicle 150, as is known in the vehicle-to-anything V2X technological art.

In the example shown in FIG. 2, at block 220, the process 200, e.g. as implemented by the authorization controller 105 as a requestor, provides login credentials to the vehicle (e.g., 150) to which it connected. In various implementations, the vehicle 150 may include a gateway 154, and the login credentials (which may include digital certificates) may be provided to the gateway 154 for processing, as is known in the art, e.g., according to a secure authentication protocol to authenticate the connecting device (e.g., the authorization controller 105) as being authorized to connect and interact with the vehicle. Based on the login credentials and/or other information, the gateway 154 may: deny all access to the onboard data of the vehicle 150, (for example, if the gateway 154 cannot authenticate the requestor); allow access to a portion or subset of the onboard data (e.g., allow access only to the data of ECUs 156 and 158, e.g., in accordance with an authorization scheme for each requestor, such as described above with respect to Table 1), or allow access to all of the onboard data (e.g., allow access to the data of any and all of the ECUs 156-158, again e.g., in accordance with an authorization scheme, such as described above with respect to Table 1).

In some implementations, the process 200 (e.g., as implemented by the authorization controller 105) will utilize requestor login credentials that allow access to all of the onboard data. In some embodiments, the access permissions for an entity, as identified by its login credentials, may be stored in a data structure such as Table 1 above, and the gateway 154 may consult the table to determine the access permissions or authorizations. For instance, where the login credentials identify the requestor as an "authorization controller" (e.g., in contrast to a "user" or a "repair shop/person"), then, as shown in the last row of Table 1, the authorization controller 105 may have access to all onboard data of the vehicle 150.

At block 225, the process 200, e.g., as implemented by the authorization controller 105, obtains the requested onboard data from the vehicle, e.g., from one or more of the ECUs 156-58 of the vehicle 150. As noted above, the gateway 154 may limit the data access to specific portions of the onboard data (e.g., limited to the data from specific ECUs, for instance according to Table 1); however, some implementations may allow the process 200 to obtain any and/or all of the onboard data (e.g., per the authorization controller permissions according to Table 1).

In some variants, the onboard data obtained from the vehicle in block 225 may be copied to a data store (e.g., 107), or the like, that is part of, or accessible by, the authorization controller 105. In such implementations, when a copy of the relevant user-requested data exists in the data store 107, the authorization control may forgo operations 215-225, and instead obtain the data from the data store 107. In another variant, the requested data may additionally or alternatively be obtained from the OEM data store 125, if it was previously stored there by the OEM. This may reduce significant time delays, for example, when the vehicle 150 is not able to connect to the wireless network 122, among other technical advantages.

At block 230, the process 200 provides the data to the owner of the vehicle. In some implementations, the process 200 provides the requested onboard data to the user 112 by displaying the data (e.g., on a graphical user interface of the vehicle user device 110) or by providing a downloadable file via a web portal or API accessed by the vehicle user device 110, or the like. After receiving the data, the user 112 may use it for various purposes, including for diagnosing, scheduling, and performing repair and maintenance on the vehicle 150. The user 112 may, for example, provide the data to a mechanic at a repair shop or to an application program that analyzes the data to recommend maintenance, repairs, and the like for the vehicle 150.

In some use cases, the user 112 may use the onboard data obtained using the system 100 to detect unobvious problems in the vehicle 150, such as a camera or other sensor that is misaligned or damaged after the vehicle was bumped in a parking garage unbeknownst to the user 112. Unobvious sensor misalignment or damage can be very dangerous because it has a negative effect on the performance of the vehicle's autonomous driving system, intelligent cruise control system, and the like. In another use case, the user 112 may show the onboard data (e.g., mileage data, airbag data, etc.) to a potential buyer of the vehicle 150 as evidence that the vehicle 150 is as advertised, e.g., in good working condition, has not been in an accident, etc., akin to a CARFAX™ report.

In yet another use case, the repair person 132 at an automotive shop or locksmith shop may use the authorization controller 105 of system 100 to obtain the security code and/or other onboard security data from the vehicle 150 and use that onboard data to create a replacement vehicle key fob for a customer who owns the vehicle 150 but lost their electronic key fob. In various embodiments, the shop person 132 may use the shop device 130 and the authorization controller 105 to supply the relevant user and vehicle information to the system 100, to verify that the customer has the required association with the vehicle 150 (e.g., is the owner, registrant, etc. of the vehicle), and to obtain the onboard data needed to rekey the vehicle for the customer.

One of ordinary skill will recognize that the operations, functions, blocks, sequence, and order described in the example of FIG. 2 may be changed, deleted, added to, or varied without departing from the scope of the scope of the present invention. For example, the operations and functions of blocks 215 and 220 may be combined.

For another example, although the example described for FIG. 2 uses the title document for the vehicle 150 and verifies whether or not the user 112 is the owner of the vehicle based on the title document information, the process 200 may be changed to use the registration document for the vehicle and to verify whether or not the user 112 is the registrant of the vehicle based on the registration document information. Similarly, the process 200 may be modified to verify that the user 112 is an employee of an organization (e.g., a company) that owns and/or registers the vehicle 150, before allowing the user 112 to access the onboard data. Again similarly, the process 200 may be modified to verify that the user 112 is a law enforcement officer or agent, and/or that the law enforcement officer or agent has a valid search warrant, before allowing the user 112 to access the onboard data. Yet again similarly, the process 200 may be modified to verify that a repair person 132 is a bona fide repair person, and/or that the repair person 132 is affiliated with a repair shop, before allowing the repair person 132 to access the onboard data.

In yet another example, before performing operations 215-225, the authorization controller 105 may determine whether it has a recently uploaded copy of the user-requested onboard data in local storage (e.g., 107), and if so, the authorization agent 105 may skip operations 215-225 and provide the requested data from the copy in operation 230.

In still another example, instead of performing operations 215-225, the authorization agent 105 may obtain a copy of the requested data from another source. For example, the requested data for the vehicle 150 may have been periodically copied to a storage location, such as the OEM data store 125, by the OEM of the vehicle 150, and the authorization agent 105 may determine that the data is available in the OEM data store 125 and obtain it from there.

Other variations are possible. For example, a process similar to process 200 may be used by a repair shop 132 to access the onboard data for the group of vehicles, such as the group of vehicles that the repair shop 132 has worked on (e.g., its customers' cars). The repair shop 132 may provide the process 200 with the VINs of the vehicles as recorded in the files of the repair shop 132 (e.g., at block 205). In such a variant, block 210 may be modified to verify that the repair shop 132 is a bona fide vehicle repair shop, for example, by confirming that the repair shop has proper state registration, business permits and/or business licenses associated with it, using state and/or local municipality business records, or the like, as a verification source 115.

Figure 3:
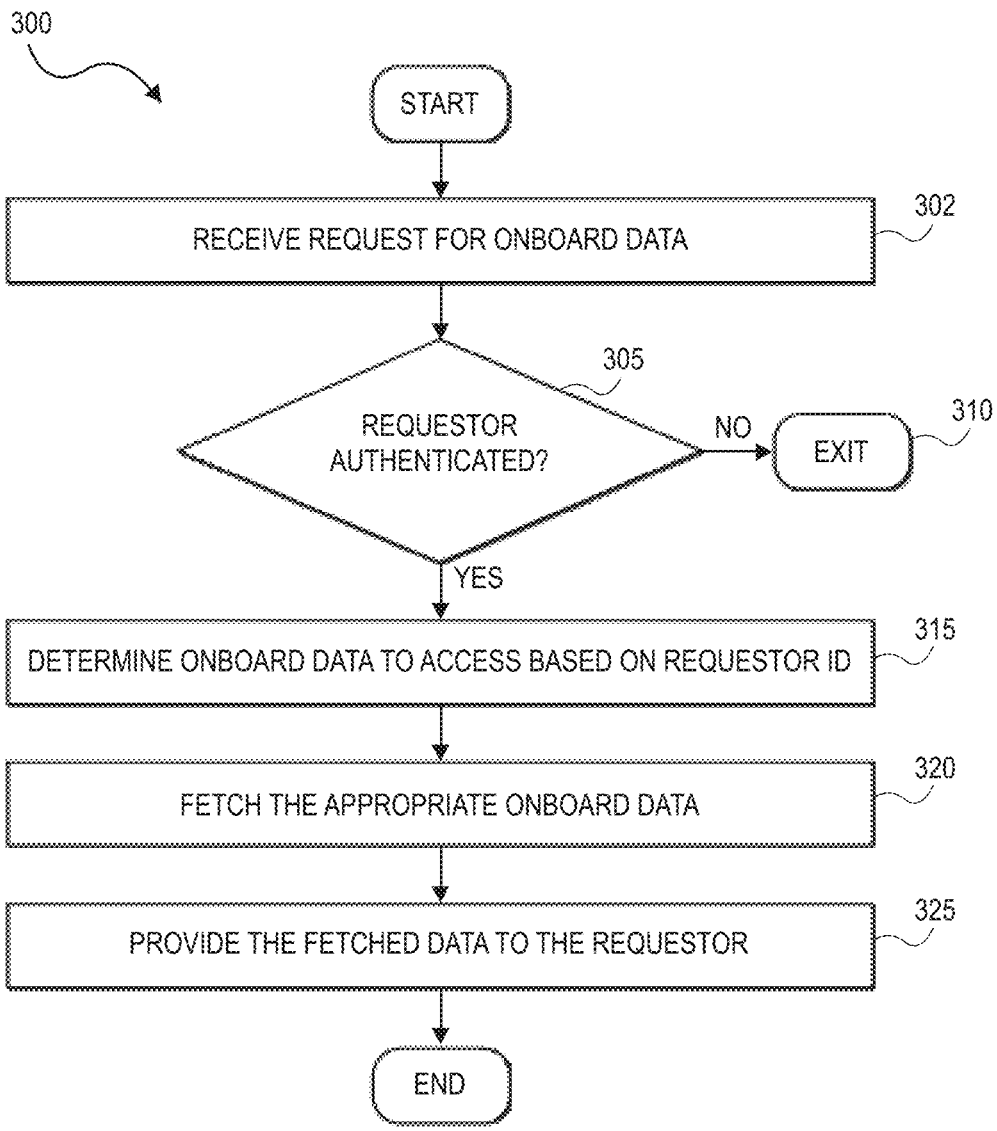
FIG. 3 is flow diagram showing an example of a process for securely allowing access to the onboard operational data stored in a vehicle, consistent with embodiments of the invention.

FIG. 3 is flow diagram showing an example of a process 300 for securely allowing access to the onboard operational data stored in a vehicle, consistent with embodiments of the invention. In various implementations, some or all of the operations of the process 300 may be performed by the gateway 154 of a vehicle 150 or a similar component.

As shown in the example of FIG. 3, the process 300 begins at block 305 by receiving a request for onboard data from a requestor. In various implementations, the request may come from an authorization controller 105 as the requestor. In some implementations, the request may come from a vehicle user device 110 or from a shop device 130, as the requestor. In various implementations, the request may include information authenticating the requestor, such as a digital certificate, and information specifying the onboard data that is being requested.

At block 305, the process 300 authenticates the requestor. In various implementations, block 305 may use a digital certificate and a secure authentication protocol to authenticate the requestor, as is known in the art. If the requestor cannot be authenticated (block 305, No), then the process 300 ends at block 310 and the interaction with requestor ceases. If, on the other hand, the requestor is authenticated (block 305, Yes), then the process 300 proceed to block 315.

At block 315, the process 300 determines which onboard data to access based on the requestor's identity. In some embodiments, the process 300 may consult the access permissions associated with the requestor's identity to determine which onboard data to access. For example, with reference to Table 1 above, if the requestor is the authorization controller (e.g., 105), then the permissions may indicate that the requestor can access all of the onboard data, regardless of the ECU that generates or stores the data. For another example, with reference to Table 1 above, if the requestor is the user (e.g., 112), then the permissions may indicate that the requestor can access only the onboard data associated with ECU 156 and ECU 158. As noted previously, other means besides a permission table are contemplated to determine which onboard data to access based on the requestor's identity.

At block 320, the process 300 fetches the appropriate onboard data. To continue the example using Table, if the requestor is a user (e.g., 112), then the gateway 154 may fetch (e.g., copy, or request and receive a copy of) the data stored by ECU 156 and ECU 158.

At block 325, the process 300 provides the fetched data to the requestor. For example, the gateway 154 may package the fetched data into an appropriate digital message(s) and then send the digital message(s) to the requestor, e.g. as a response to the request received in block 302. After providing the fetched/requested data to the requestor, the process 300 ends.

Other variations are possible in addition to those already described. For example, the authorization controller 105 may connect with the vehicle 150 periodically, or on demand from a user (e.g., user 112 or repair person 132) of the system 100, and simply upload a copy of some or all of the data from all (or some) of the ECUs 156-158 of the vehicle 150, according with its permissions in the fourth row of Table 1. After obtaining a copy of the data, which may be stored in the data store 107, the authorization controller 105 may itself implement the data access permission limitations shown in Table 1 for the user 112 and the repair shop 132. In such variants, the second and third rows of Table 1 may not be present or needed by the gateway 154.

In yet another variant, the user 112 may provide information (e.g. information from the vehicle registration document) to the repair shop 132 and authorize the repair shop to utilize the information and the system 100 on behalf of the user 112 to get onboard information from the vehicle 150 of the user 112.

As mentioned previously, in some implementations, the users of the system 100, (e.g., the user 112 and the repair shop 132) may pay one or more fees for access the onboard data of the vehicle 150 and/or other vehicles, and the fee(s) may vary depending on how much and/or which onboard data is accessed in each vehicle and/or how many vehicles are included. For example, referring again to Table 1 above, the user 112 may have subscribed to access to two types of onboard data from their vehicle 150, for example, error code data, (which corresponds to, or comes from, ECU 156 in this example) and some type of telematics data, (which corresponds to, or comes from, ECU 158 in this example), and the user 112 may have paid two fees (e.g., two yearly subscription fees) for access to these two types of data. Per Table 1, the system 100 does not allow the user 112 to access onboard data other than the data to which the user 112 subscribed.

Although the examples described herein use ECUs to describe, type, partition, or classify the distinct types and sources of onboard data available from a vehicle 150, this convention is meant for clarity of explanation and is not meant to be limiting. In other implementations, the onboard data may be described, typed, partitioned, or classified in other ways, for example using categories such as telematics data, error code data, location data, tire pressure data, etc., which may or may not correspond to an ECU, or which may or may not correspond to a specific set of ECUs.

Figure 4:
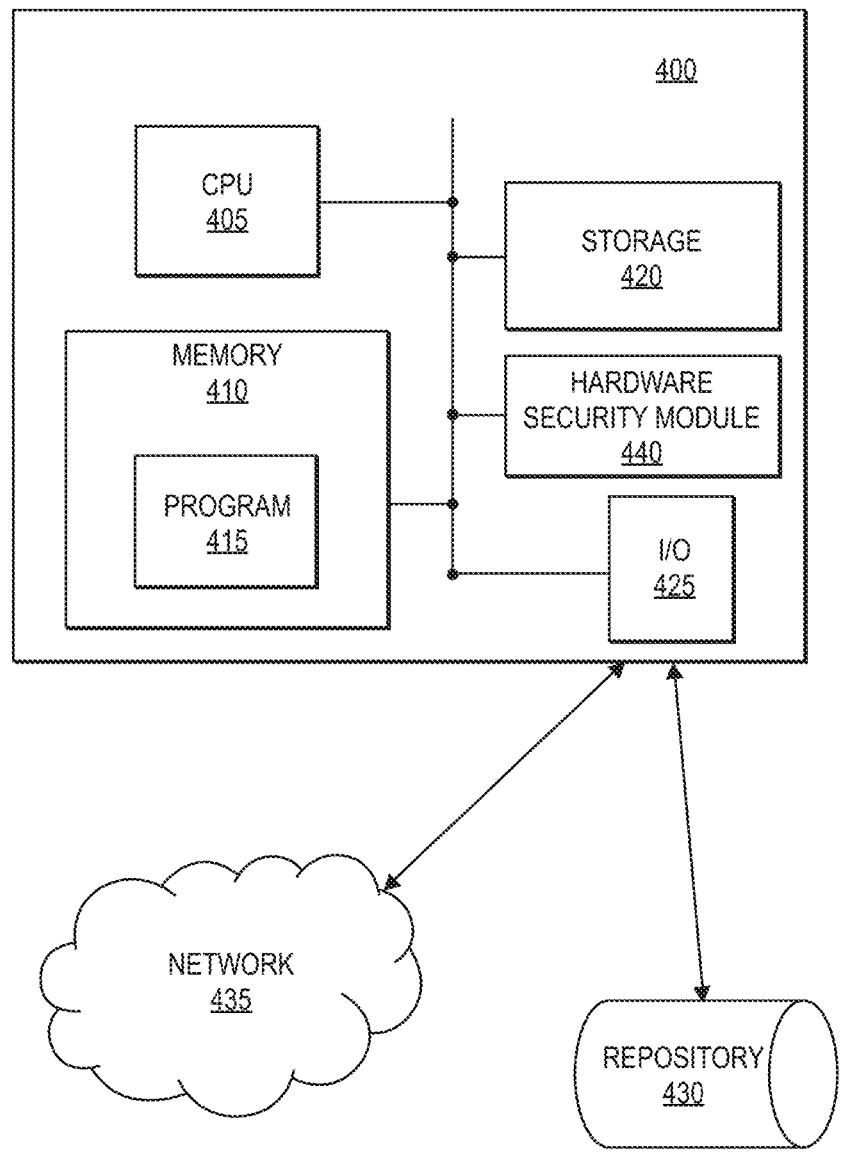
FIG. 4 is a block diagram of an example of a computing system that may be used for hosting and implementing systems, functions, operations, and methods consistent with implementations of the invention.

FIG. 4 is a block diagram of an example of a computing environment which includes a computing system 400 that may be used for implementing systems, devices, and methods consistent with implementations of the invention. Other components and/or arrangements may also be used. In some implementations, one or more computing system 400 may be used to implement, partially or fully, various components, processes, operations, and data records described in relation to FIGS. 1-3, such as the authorization controller 105, the vehicle user device 110, the shop device 130, verification source 115, the OEM data store 125 and/or the gateway 154, among other things. In some implementations, a series of computing systems similar to the computing system 400 may be each customized with specialized hardware and/or programmed as a specialized server to implement one or more of the features described in relation to FIGS. 1-3, which may communicate with each other via a network 435, which may be the same as, connected to, or part of the networks 120, 122.

In the example shown in FIG. 4, the computing system 400 includes a number of components, such as a CPU 405, a memory 410, an input/output (I/O) device(s) 425, a hardware security module (HSM) 440, and a storage device 420. The system 400 can be implemented in various ways. For example, an implementation as an integrated platform (such as a server, workstation, personal computer, laptop, etc.) may comprise a CPU 405, a memory 410, a nonvolatile storage 420, and I/O devices 425. In such a configuration, the components 405, 410, 420, and 425 may connect and communicate through a local data bus and may access a data repository 430 (e.g., data store 107 and/or OEM data store 125) via an external I/O connection. The I/O component(s) 425 may connect to external devices through a direct communication link (e.g., a hardwired or local Wi-Fi connection), through a network 435, such as a local area network (LAN) or a wide area network (WAN, such as a cellular telephone network or the Internet), and/or through other suitable connections. The system 400 may be standalone, or it may be a subsystem of a larger system.

The CPU 405 may be one or more known processor or processing devices, such as a microprocessor from the Core™ family manufactured by the Intel™ Corporation of Santa Clara, CA or a microprocessor from the Athlon™ family manufactured by the AMD™ Corporation of Sunnyvale, CA. The memory 410 may be one or more fast storage devices configured to store instructions and information executed or used by the CPU 405 to perform certain functions, methods, and processes related to implementations of the present invention. The storage 420 may be a volatile or non-volatile, magnetic, semiconductor, tape, optical, or other type of storage device or computer-readable medium, including devices such as CDs and DVDs and solid-state devices, meant for long-term storage.

In the illustrated implementation, the memory 410 contains one or more instructions, programs or applications 415, which may be loaded from the storage 420 or from a remote system (not shown), that, when executed by the CPU 405, perform various operations, procedures, processes, functions or methods consistent with the present invention, e.g., as described in conjunction with FIGS. 1-3. Alternatively, the CPU 405 may execute one or more programs located remotely from the system 400. For example, the system 400 may access one or more remote programs via the network 435 that, when executed, perform functions, operations and processes related to implementations of the present invention.

In one implementation, the memory 410 may include a program(s) 415 for performing the specialized functions and operations described herein with regard to the system 100 for securely accessing onboard data. In some implementations, the memory 410 may also include other instructions, programs or applications that implement the methods of FIGS. 2 and 3, as well as other methods and processes that provide ancillary functionality to the invention.

The memory 410 may also be configured with other programs (not shown) unrelated to the invention and/or an operating system (not shown) that performs several functions well known in the art when executed by the CPU 405. By way of example, the operating system may be Microsoft Windows™, Unix™, Linux™, an Apple Computers™ operating system, or other operating system. The choice of operating system, and even the use of an operating system, is not critical to the invention.

The HSM 440 may be a device with its own processor that securely generates and stores digital security assets and/or securely performs a variety of cryptographic and sensitive computations. The HSM 440 protects digital security assets, such as cryptographic keys, and other sensitive data from possible access by an attacker. In some implementations, the HSM may be a plug-in card or board that attaches directly to the computing system 400.

The I/O device(s) 425 may comprise one or more input/output devices that allow data to be received and/or transmitted by the system 400. For example, the I/O device 425 may include one or more input devices, such as a keyboard, touch screen, mouse, and the like, that enable data to be input from a user. Further, the I/O device 425 may include one or more output devices, such as a display screen, a CRT monitor, an LCD monitor, a plasma display, a printer, speaker devices, and the like, that enable data to be output or presented to a user. The I/O device 425 may also include one or more digital and/or analog communication input/output devices that allow the computing system 400 to communicate, for example, digitally, with other machines and devices. Other configurations and/or numbers of input and/or output devices may be incorporated in the I/O device 425.

In the implementation shown, the system 400 is connected to a network 435 (such as the Internet, a private network, a virtual private network, a cellular network or other network or combination of these), which may in turn be connected to various systems and computing machines, such as servers, personal computers, laptop computers, client devices, etc. In general, the system 400 may input data from external machines and devices and output data to external machines and devices via the network 435. In some implementations, the network 435 may be, or be part of, the network 120, 122.

In the exemplary implementation shown in FIG. 4, the data repository 430 is a standalone database external to system 400, such as the database 125. In other implementations, the data source 430 may be hosted by the system 400. In various implementations, the data source 430 may manage and store data used to implement systems and methods consistent with the invention. For example, the data source 430 may manage and store data (e.g., previously read onboard data from a vehicle 150) that are used by the operational data access system 100.

The data source 430 may comprise one or more databases that store information and are accessed and/or managed through the system 400. By way of example, the database 430 may be an Oracle™ database, a Sybase™ database, or other relational database. Systems and methods consistent with the invention, however, are not limited to separate data structures or databases, or even to the use of a database or data structure.

One of ordinary skill will recognize that the components and implementation details of the system in FIG. 4 are examples presented for conciseness and clarity of explanation. Other components and implementation details may be used.

Although the examples described herein describe vehicles as the source of onboard operational data, vehicles are just one example that are used for clarity of explanation and the invention is not meant to be limited solely to vehicles. The principles of the invention may be applied to many different kinds of computerized devices that create, collect, and/or store operational data, for example, Internet-of-Things (IoT) devices, V2X roadside units, etc.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances. As used herein, the terms "and" and "or" should be interpreted as "and/or."

Other embodiments of the invention will be apparent to those skilled in the art from consideration of the specification and practice of the invention disclosed herein. It is intended that this specification and the descriptions herein be considered as examples only.

What is claimed is:

1. A system for accessing onboard operational data from a vehicle, the system comprising:
    a memory device containing instructions;
    a processor that is communicatively connected to the memory device and that executes the instructions to perform operations comprising:
        obtaining user information that identifies a specific user;
        obtaining verification information from a verification source, wherein the verification information describes a vehicle and the specific user, and wherein the obtaining the verification information comprises receiving at least one of vehicle title information or vehicle registration information from a department of motor vehicles;
        verifying that the specific user is associated with the vehicle based on the verification information;
        communicatively connecting to the vehicle based on a success of the verifying, whereby an unverified user is prevented from communicatively connecting to the vehicle;
        obtaining log in credentials associated with the specific user, wherein the log in credentials are associated with a subset of onboard operational data of the vehicle, wherein the subset of onboard operational data comprises vehicle subsystem data, wherein the vehicle subsystem comprises at least one of: a brake control subsystem, a steering control subsystem, an electronics subsystem, an environment control subsystem, an engine control subsystem, a backup camera subsystem, a suspension control subsystem, a telemetry subsystem, a door lock subsystem, or a transmission control subsystem, and wherein the vehicle subsystem data comprises at least one of: vehicle subsystem telematics data, vehicle subsystem vehicle movement data, vehicle subsystem vehicle operator inputs, vehicle subsystem settings data, vehicle subsystem functioning data, or vehicle subsystem communications data;
        logging in to a gateway of the vehicle by an authorization controller, using a secure authentication protocol, and using the log in credentials, wherein the specific user is given access to the subset of onboard operational data, whereby the specific user is prevented from accessing onboard operational data of the vehicle other than the subset of onboard operational data;
        requesting at least some of the subset of onboard operational data from the vehicle;
        receiving the at least some of the subset of onboard operational data from the vehicle; and
        providing the at least some of the subset of onboard operational data to a vehicle user device of the specific user for the specific user to use the at least some of the subset of onboard operational data to diagnose, schedule, or perform service on the vehicle.

2. The system of claim 1, wherein the subset of onboard operational data comprises vehicle subsystem telematics data of the vehicle obtained by a vehicle subsystem, wherein the vehicle subsystem telematics data comprises at least one of: vehicle maintenance requirement data or vehicle servicing data.

3. The system of claim 1, wherein obtaining user information that identifies a specific user comprises:
    receiving a name and a date of birth for the specific user.

4. The system of claim 1, wherein verifying that the specific user is associated with the vehicle comprises:
    comparing the user information that identifies a specific user with the verification information that describes the specific user.

5. The system of claim 1, wherein the operations further comprise:
    storing the at least some of the subset of onboard operational data that is received from the vehicle; and
    providing the at least some of the subset of onboard operational data that was stored.

6. The system of claim 1, wherein the subset of onboard operational data is less than an entirety of onboard operational data of the vehicle.

7. The system of claim 1, wherein the subset of onboard operational data corresponds to a fee paid by the specific user.

8. The system of claim 1, wherein communicatively connecting to the vehicle comprises:
communicatively connecting to the vehicle using a vehicle identification number (VIN).

9. A computer-implemented method for accessing onboard operational data in a vehicle, the method comprising:
obtaining user information that identifies a specific user;
obtaining verification information from a verification source, wherein the verification information describes a vehicle and the specific user, and wherein the obtaining the verification information comprises receiving at least one of vehicle title information or vehicle registration information from a department of motor vehicles;
verifying that the specific user is associated with the vehicle based on the verification information;
communicatively connecting to the vehicle based on a success of the verifying, whereby an unverified user is prevented from communicatively connecting to the vehicle;
obtaining log in credentials associated with the specific user, wherein the log in credentials are associated with a subset of onboard operational data of the vehicle, wherein the subset of onboard operational data comprises vehicle subsystem data, wherein the vehicle subsystem comprises at least one of: a brake control subsystem, a steering control subsystem, an electronics subsystem, an environment control subsystem, an engine control subsystem, a backup camera subsystem, a suspension control subsystem, a telemetry subsystem, a door lock subsystem, or a transmission control subsystem, and wherein the vehicle subsystem data comprises at least one of: vehicle subsystem telematics data, vehicle subsystem vehicle movement data, vehicle subsystem vehicle operator inputs, vehicle subsystem settings data, vehicle subsystem functioning data, or vehicle subsystem communications data;
logging in to a gateway of the vehicle by an authorization controller, using a secure authentication protocol, and using the log in credentials, wherein the specific user is given access to the subset of onboard operational data, whereby the specific user is prevented from accessing onboard operational data of the vehicle other than the subset of onboard operational data;
requesting at least some of the subset of onboard operational data from the vehicle;
receiving the at least some of the subset of onboard operational data from the vehicle; and
providing the at least some of the subset of onboard operational data to a vehicle user device of the specific user for the specific user to use the at least some of the subset of onboard operational data to diagnose, schedule, or perform service on the vehicle.

10. The computer-implemented method of claim 9, wherein the subset of onboard operational data comprises vehicle subsystem telematics data of the vehicle obtained by a vehicle subsystem, wherein the vehicle subsystem telematics data comprises at least one of: vehicle maintenance requirement data or vehicle servicing data.

11. The computer-implemented method of claim 9, wherein obtaining user information that identifies a specific user comprises:
receiving a name and a date of birth for the specific user.

12. The computer-implemented method of claim 9, wherein verifying that the specific user is associated with the vehicle comprises:
comparing the user information that identifies a specific user with the verification information that describes the specific user.

13. The computer-implemented method of claim 9, wherein the operations further comprise:
storing the at least some of the subset of onboard operational data that is received from the vehicle; and
providing the at least some of the subset of onboard operational data that was stored.

14. The computer-implemented method of claim 9, wherein the subset of onboard operational data is less than an entirety of onboard operational data of the vehicle.

15. The computer-implemented method of claim 9, wherein the subset of onboard operational data corresponds to a fee paid by the specific user.

16. The computer-implemented method of claim 9, wherein communicatively connecting to the vehicle comprises:
communicatively connecting to the vehicle using a vehicle identification number (VIN).

17. A non-transitory computer readable medium including instructions that, when executed by a processor, perform a method of accessing onboard operational data from a vehicle by performing actions comprising:
obtaining user information that identifies a specific user;
obtaining verification information from a verification source, wherein the verification information describes a vehicle and the specific user, and wherein the obtaining the verification information comprises receiving at least one of vehicle title information or vehicle registration information from a department of motor vehicles;
verifying that the specific user is associated with the vehicle based on the verification information;
communicatively connecting to the vehicle based on a success of the verifying, whereby an unverified user is prevented from communicatively connecting to the vehicle;
obtaining log in credentials associated with the specific user, wherein the log in credentials are associated with a subset of onboard operational data of the vehicle, wherein the subset of onboard operational data comprises vehicle subsystem data, wherein the vehicle subsystem comprises at least one of: a brake control subsystem, a steering control subsystem, an electronics subsystem, an environment control subsystem, an engine control subsystem, a backup camera subsystem, a suspension control subsystem, a telemetry subsystem, a door lock subsystem, or a transmission control subsystem, and wherein the vehicle subsystem data comprises at least one of: vehicle subsystem telematics data, vehicle subsystem vehicle movement data, vehicle subsystem vehicle operator inputs, vehicle subsystem settings data, vehicle subsystem functioning data, or vehicle subsystem communications data;
logging in to a gateway of the vehicle by an authorization controller, using a secure authentication protocol, and using the log in credentials, wherein the specific user is given access to the subset of onboard operational data, whereby the specific user is prevented from accessing onboard operational data of the vehicle other than the subset of onboard operational data;

requesting at least some of the subset of onboard operational data from the vehicle;

receiving the at least some of the subset of onboard operational data from the vehicle; and providing the at least some of the subset of onboard operational data to a vehicle user device of the specific user for the specific user to use the at least some of the subset of onboard operational data to diagnose, schedule, or perform service on the vehicle.

18. The non-transitory computer readable medium of claim 17, wherein the subset of onboard operational data comprises vehicle subsystem telematics data of the vehicle obtained by a vehicle subsystem, wherein the vehicle subsystem telematics data comprises at least one of: vehicle maintenance requirement data or vehicle servicing data.

19. The non-transitory computer readable medium of claim 17, wherein obtaining user information that identifies a specific user comprises:

receiving a name and a date of birth for the specific user.

20. The non-transitory computer readable medium of claim 17, wherein verifying that the specific user is associated with the vehicle comprises:

comparing the user information that identifies a specific user with the verification information that describes the specific user.

21. The non-transitory computer readable medium of claim 17, wherein the operations further comprise:

storing the at least some of the subset of onboard operational data that is received from the vehicle; and providing the at least some of the subset of onboard operational data that was stored.

22. The non-transitory computer readable medium of claim 17, wherein the subset of onboard operational data is less than an entirety of onboard operational data of the vehicle.

23. The non-transitory computer readable medium of claim 17, wherein the subset of onboard operational data corresponds to a fee paid by the specific user.

24. The non-transitory computer readable medium of claim 17, wherein communicatively connecting to the vehicle comprises:

communicatively connecting to the vehicle using a vehicle identification number (VIN).

* * * * *